United States Patent
Man-Hak Tso et al.

(10) Patent No.: US 7,606,252 B2
(45) Date of Patent: Oct. 20, 2009

(54) STATELESS MESSAGE ROUTING

(75) Inventors: Michael Man-Hak Tso, Saratoga, CA (US); Joseph Wayne Norton, Tokyo (JP); Gara Hayato Ogasawara, Foster City, CA (US); Jonah Schwartz, Oakland, CA (US); David Stone, Union City, CA (US)

(73) Assignee: Gemini Mobile Technologies, Inc., Foster City, CA (US)

( * ) Notice: Subject to any disclaimer, the term of this patent is extended or adjusted under 35 U.S.C. 154(b) by 1013 days.

(21) Appl. No.: 10/735,696

(22) Filed: Dec. 16, 2003

(65) Prior Publication Data
US 2004/0170158 A1 Sep. 2, 2004

Related U.S. Application Data

(60) Provisional application No. 60/433,592, filed on Dec. 16, 2002.

(51) Int. Cl.
*H04L 12/54* (2006.01)
*G06F 15/16* (2006.01)

(52) U.S. Cl. .................... 370/428; 709/206
(58) Field of Classification Search ............... 370/351, 370/354, 395.3, 389, 395.2, 382, 300, 392, 370/378, 379, 381, 383, 395.7, 395.71, 395.72, 370/395.21, 395.31, 395.32, 401, 428, 465, 370/395, 527; 709/206, 224, 245, 203, 240, 709/207; 707/100
See application file for complete search history.

(56) References Cited

U.S. PATENT DOCUMENTS

| | | | | |
|---|---|---|---|---|
| 3,870,828 | A * | 3/1975 | Saliga | 370/527 |
| 4,980,913 | A | 12/1990 | Skret | |
| 6,161,198 | A * | 12/2000 | Hill et al. | 714/15 |
| 6,351,776 | B1 * | 2/2002 | O'Brien et al. | 709/245 |
| 6,370,584 | B1 * | 4/2002 | Bestavros et al. | 709/238 |
| 6,483,834 | B1 * | 11/2002 | Salisbury | 370/395.2 |

(Continued)

FOREIGN PATENT DOCUMENTS

WO  WO 9638987 A1 * 12/1996

(Continued)

OTHER PUBLICATIONS

Secure Flow Processing Enhances QoS in Routers Robert Friend, Hifn Jun. 11, 2002 (5:19 AM) URL: http://www.commsdesign.com/showArticle.jhtml?articleID=16505133.*

(Continued)

*Primary Examiner*—Aung S Moe
*Assistant Examiner*—Awet Haile
(74) *Attorney, Agent, or Firm*—Crowell & Moring LLP

(57) ABSTRACT

Systems and methods of processing incoming data provide for receiving incoming data and determining whether to employ stateless routing of the incoming data based on one or more destination hosts associated with the incoming data. In one approach, stateless routing involves storing the incoming data only in volatile memory and withholding confirmation of receipt of the incoming data until confirmation of delivery is received from either the destination host or a downstream router. The determination as to whether stateless routing should be employed can take into consideration historical data for the destination host as well as control data. The determination can also be based on the number of destination hosts.

26 Claims, 5 Drawing Sheets

U.S. PATENT DOCUMENTS

| | | | |
|---|---|---|---|
| 6,721,315 B1 * | 4/2004 | Xiong et al. | 370/389 |
| 6,801,604 B2 * | 10/2004 | Maes et al. | 379/88.17 |
| 6,822,957 B1 * | 11/2004 | Schuster et al. | 370/389 |
| 7,079,538 B2 * | 7/2006 | Gazsi et al. | 370/392 |
| 7,194,535 B2 * | 3/2007 | Hannel et al. | 709/224 |
| 7,202,978 B2 * | 4/2007 | Gordon et al. | 358/400 |
| 7,260,186 B2 * | 8/2007 | Zhu et al. | 379/45 |
| 7,487,212 B2 * | 2/2009 | Taylor | 709/206 |
| 2001/0024436 A1 * | 9/2001 | Barraclough et al. | 370/352 |
| 2001/0030961 A1 * | 10/2001 | Gazsi et al. | 370/389 |
| 2002/0116524 A1 * | 8/2002 | Anson et al. | 709/240 |
| 2003/0074413 A1 * | 4/2003 | Nielsen et al. | 709/206 |
| 2003/0101190 A1 * | 5/2003 | Horvitz et al. | 707/100 |
| 2003/0135573 A1 * | 7/2003 | Taylor | 709/207 |
| 2003/0212818 A1 * | 11/2003 | Klein et al. | 709/238 |
| 2004/0170158 A1 * | 9/2004 | Man-Hak Tso et al. | 370/351 |
| 2006/0036683 A1 * | 2/2006 | Bracewell et al. | 709/203 |
| 2008/0228892 A1 * | 9/2008 | Staack et al. | 709/206 |

FOREIGN PATENT DOCUMENTS

| | | |
|---|---|---|
| WO | WO 99/08424 | 2/1999 |
| WO | WO 9908424 A1 * | 2/1999 |

OTHER PUBLICATIONS

Riley, George F., et al., "Stateless Routing in Network Simulations," Modeling, Analysis and Simulation of Computer and Telecommunication Systems, 2000, Proceedings, 8$^{th}$ International Symposium in San Francisco, CA, USA 29, Aug.-Sep. 1. Aug. 29, 2000; pp. 524-531; XP010515455.

Examination Communication in related EP application 03 814 805.2-2416 dated Jan. 12, 2009.

Office Action in related JP application 2004-565495 dated Feb. 3, 2009.

* cited by examiner

US 7,606,252 B2

STATELESS MESSAGE ROUTING

CROSS-REFERENCE TO RELATED APPLICATIONS

The present application claims priority to U.S. provisional application Ser. No. 60/433,592 filed on Dec. 16, 2002, incorporated herein by reference in its entirety, and benefits from the filing date thereof.

BACKGROUND

1. Technical Field

Embodiments of the present invention generally relate to the routing of electronic messages. More particularly, the embodiments relate to systems and methods of selectively routing messages in an unsaved state.

2. Discussion

As the popularity of the Internet and wireless communication continues to grow, network designers and service providers are presented with a number of performance concerns. A particular concern relates to message routing. A message router receives messages from sender hosts (e.g., senders) and forwards these messages to one or more destination hosts (e.g., receivers). The process of receiving and sending a message is sometimes called a transaction, and is an important component of any networking architecture. It is not uncommon for a high performance message router to be required to complete hundreds of transactions per second.

Traditional messaging systems use a store-and-forward model for message routing. Under such an approach, when a message is received by a router the message is stored to a nonvolatile memory (NVM) so that the contents are preserved when there is no power applied to the memory. Examples of NVM include, but are not limited to, electrically erasable programmable read only memory (EEPROM) and magnetic disk. Storing the message to NVM enables recovery of the message in the event of a system crash or power failure. Unfortunately, reading from and writing to NVM is relatively slow, and may result in a performance bottleneck in the network. There is therefore a need for a system and method of routing messages that takes into consideration the possibility of system crashes and power failures, while preventing message loss and eliminating the bottleneck concerns associated with traditional store-and-forward routing models.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
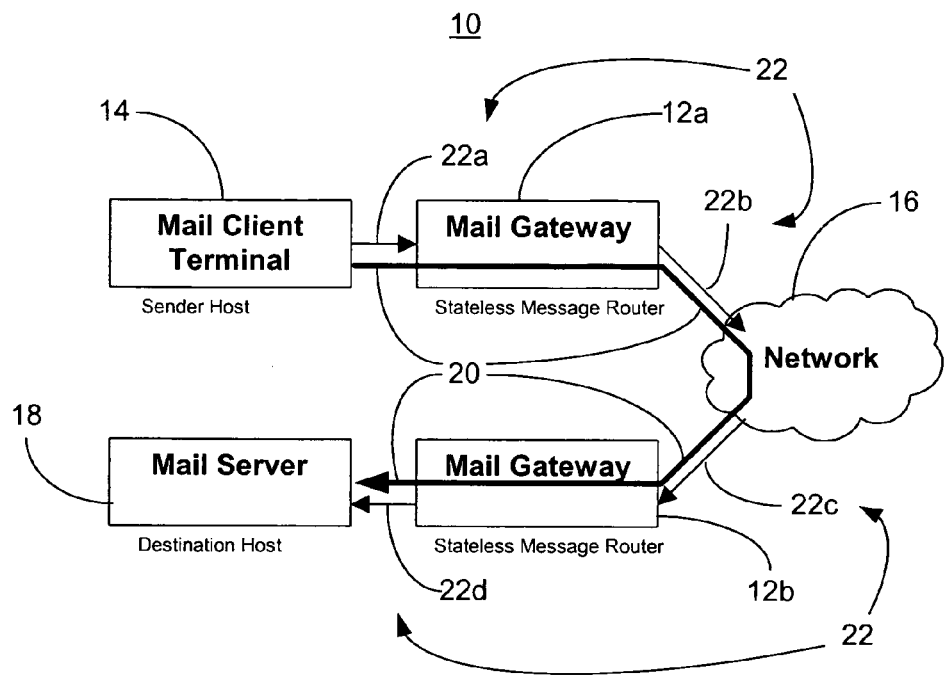
FIG. 1 is a block diagram of an example of a messaging architecture according to one embodiment of the invention.

FIG. 1 shows an architecture 10 having a sender host 14 (e.g., a mail client terminal) and a destination host 18 (e.g., a mail server). The sender host 14 communicates with a stateless message router 12a (e.g., a mail gateway) and destination host 18 communicates with a stateless message router 12b (e.g., a mail gateway), where the routers 12a, 12b communicate with one another via a network 16. As will be discussed in greater detail, the term "stateless" is used herein to describe the process of routing a message without first storing the message to nonvolatile memory (NVM). Thus, the message is sent toward the destination host 18 in an "unsaved" state with regard to NVM. Stateless routing may also involve withholding confirmation of receipt of a message until confirmation of delivery of the message is received from either the destination host or a downstream router.

Although certain examples will be described herein with reference to the routing of messages to a destination host, the embodiments of the invention are not so limited. Indeed, the principles described herein can be readily applied to any type of incoming data without parting from the spirit and scope of the embodiments of the invention. For example, images, sound files and other types of data can also benefit from the principles described herein. Notwithstanding, there are a number of aspects of messages for which the embodiments of the invention are well suited. It should also be noted that a single message might be destined for multiple recipients (not shown) and/or destination hosts, where each destination host services the recipients that are connected to that particular receiver host.

In the illustrated example, a virtual circuit 20 is established between hosts 14 and 18, by way of a plurality of connections 22 (22a-22b) and can be implemented via a wide variety of protocols such as a Simple Message Transport Protocol (SMTP), (Request for Comment/RFC 2821); a Short Message Peer to Peer (SMPP) protocol, (Protocol Specification/ V3.4 Issue 1.2, Short Message Service/SMS Forum); or a Multimedia Message Service Client Transaction Specification (MMSCTR) protocol, (WAP-206-MMSCTR-20020115-a). More than one such protocol can be used within a single transaction, one protocol for receiving the message from an sender host, and another for sending to a destination host.

It should be noted that traditional Internet Protocol (1P) routing of data packets is designed to tolerate a certain amount of data loss, whereas routing messages such as Email messages requires a higher level of reliability. As a result, message routers are less tolerant to data loss and have traditionally employed the store-and-forward model discussed above. While certain embodiments will be described in reference to one or more of the above protocols, it should be noted that the embodiments of the invention are not so limited. Indeed, any connection protocol in which stateless message routing can be implemented may be used. Notwithstanding, there are a number of aspects of embodiments of the invention for which the above protocols are well suited.

The routers 12a, 12b can use stateless messaging to route messages without first saving them to NVM. In one approach, the sender host 14 transmits a message to the message router 12a, and the message router 12a does not immediately confirm receipt of the message. Instead the message router 12a connects to the message router 12b through network 16 and transmits the message. The message router 12b follows a similar stateless message routing approach with regard to the destination host 18. Only after the message router 12b confirms delivery of the message to the destination host 18, and the message router 12a confirms delivery of the message to the message router 12b does the router 12a send confirmation of its own receipt of the message to the sender host 14. As a result, the architecture 10 avoids any need to store a copy of the message in NVM at either of the routers 12a, 12b. Since the single sender host 14 stores a copy of the message in NVM until the confirmation of receipt is received, the likelihood of data loss is minimized or eliminated.

Figure 2:
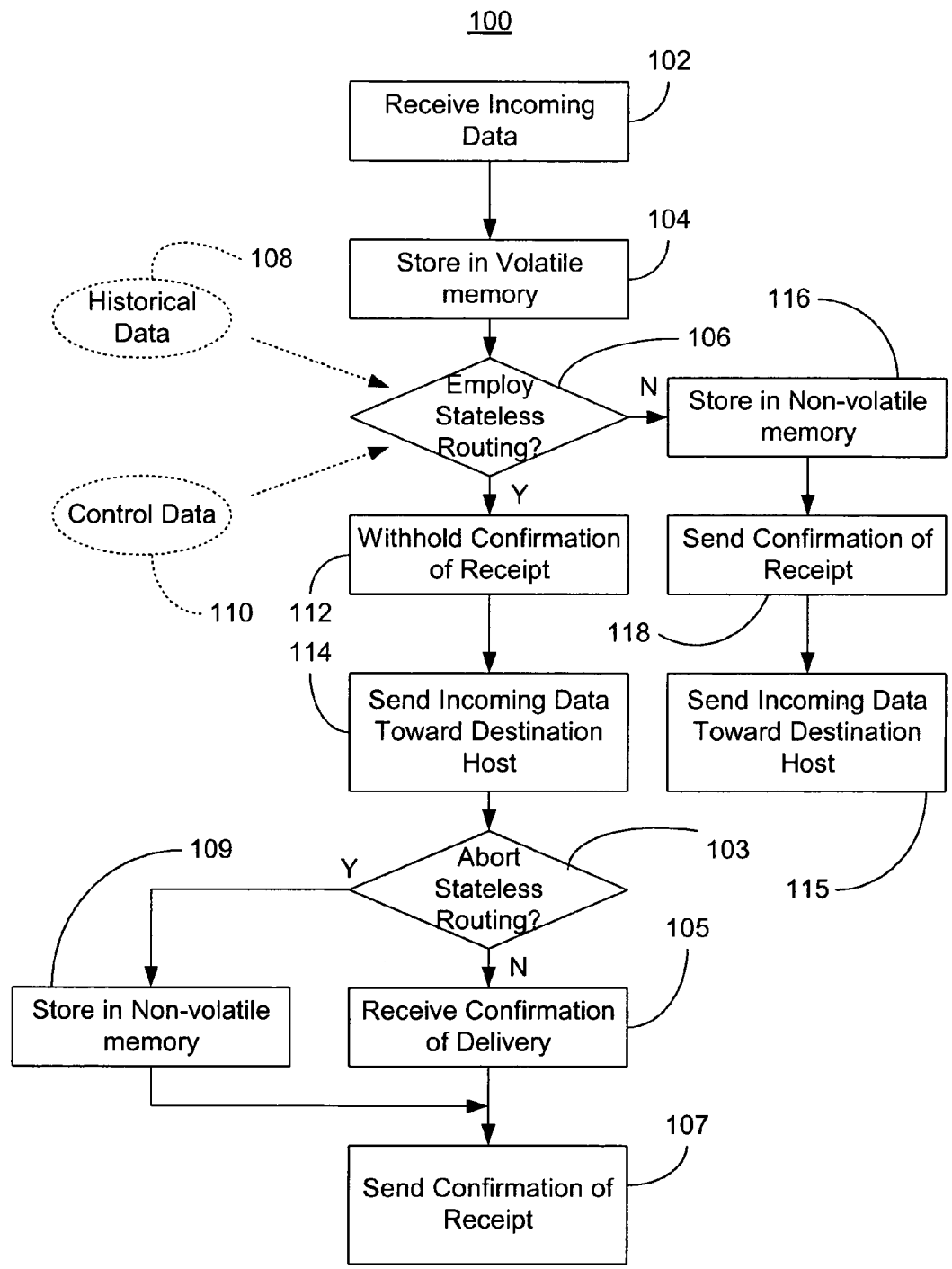
FIG. 2 is a flowchart of an example of a method of processing incoming data according to one embodiment of the invention.

FIG. 2 shows a method 100 of processing incoming data. The method 100 can be implemented as a set of instructions capable of being executed by a processor. The instructions can be written using any number of well-known software programming techniques and can be stored in a wide variety of machine-readable media such as electrically erasable programmable read-only memory (EEPROM), compact disk ROM (CD-ROM), dynamic random access memory (DRAM), etc. Incoming data is received at processing block 102 and the incoming data is stored in volatile memory at block 104. Processing block 106 provides for determining whether to employ stateless routing of the incoming data based on a destination host associated with the incoming data. As will be discussed in greater detail, the determination at block 106 can make use of history data 108 and/or control data 110. If the decision is made to employ stateless routing, confirmation of receipt of the incoming data can also be withheld at block 112 until confirmation of delivery is received from either the destination host or another downstream router. Block 114 provides for sending the incoming data toward the destination host.

If it is determined at block 106 that stateless routing is not to be employed, the incoming data is stored in NVM at block 116. In such a case, confirmation need not be withheld from the sender of the incoming data. Thus, block 118 provides for sending confirmation of receipt of the incoming data toward the sender host and block 115 provides for sending the incoming data toward the destination host.

Block 103 provides for determining whether to abort the stateless routing. The determination at block 103 can be made based on a number of factors such as latency and priority. For example, if a timeout occurs after forwarding the incoming data toward the destination host, it may be determined that stateless routing should be aborted. It should also be noted that the determination at block 103 can be made more than once for a given destination host. If it is determined at block 103 that stateless routing should be continued, block 105 provides for receiving confirmation of delivery of the incoming data from either the destination host or a downstream router. Confirmation of receipt of the incoming data is sent toward the sender of the incoming data at block 107. Accordingly, as illustrated in FIG. 2, when incoming data is stored in volatile memory (step 104) and the decision is made to employ stateless routing ("Y" path out of decision step 106) and to maintain the performance of stateless routing ("N" path out of decision step 103), then the incoming data is stored only in volatile memory. If it is determined at block 103 that stateless routing should be aborted, block 109 provides for storing the incoming data in NVM and receiving the confirmation of delivery at block 105 is bypassed.

The historical data 108 can provide a wide variety of information that can be useful in making the determination at block 106. For example, the historical data 108 can include previous stateless routing outcomes for the particular destination host. In such a case, the historical data might identify whether N out of the last M stateless routing transactions succeeded and processing block 106 could calculate a success rate probability based on the previous stateless routing outcomes. If the success rate probability is above a predetermined success rate threshold, then it can be determined that stateless routing should be employed for the destination host in question. Alternatively, the historical data 108 can include previous routing latencies, which can be averaged for the last M transactions. The calculated latency average, which can be weighted to favor more recent transactions, can be compared to a latency threshold in making the determination at processing block 106.

In one approach, the control data 110 can be received over a corresponding control channel, where the incoming data has a corresponding incoming data channel and the two channels are independent from one another. In another approach, the control data 110 can be embedded into the header or envelope information of a message and received via the traditional data channel. One example of control data includes a "time-to-live" (TTL) value after which stateless routing should be discontinued. Another example is a "hop-count" value, which specifies the number of stateless routing hops the incoming data has been through. The hop-count value is incremented by each stateless router before passing it on to the next. In yet another example of control data, a "maximum-hop" value can specify the maximum number of stateless routing hops along which incoming data can be passed, where the maximum-hop value is decremented by each stateless router before passing it to the next router. It should be noted that the TTL and maximum-hop values can be reduced if the incoming data is associated with a plurality of destination hosts. Reducing these values accounts for the decreased likelihood of successful stateless routing in the case of multiple destination hosts.

The decision at processing block 106 can generate a binary decision representative of whether stateless routing is to be employed, a probability decision representative of whether stateless routing is to be employed, and so on. In the case of a plurality of destination hosts, a binary decision can be generated for each of the plurality of destination hosts, where an AND operation is performed between each of the binary decisions to represent whether stateless routing is to be employed. Similarly, for probability decisions, a probability decision can be generated for each of the plurality of destination hosts, where the probability decisions are multiplied together to represent whether stateless routing is to be employed.

The incoming data, whether a message or other type of data, can be streamed through the routers if so desired. In such a case, the sending of incoming data toward the destination host at block 114 begins before completion of the receiving of the incoming data at block 102.

Figure 3:
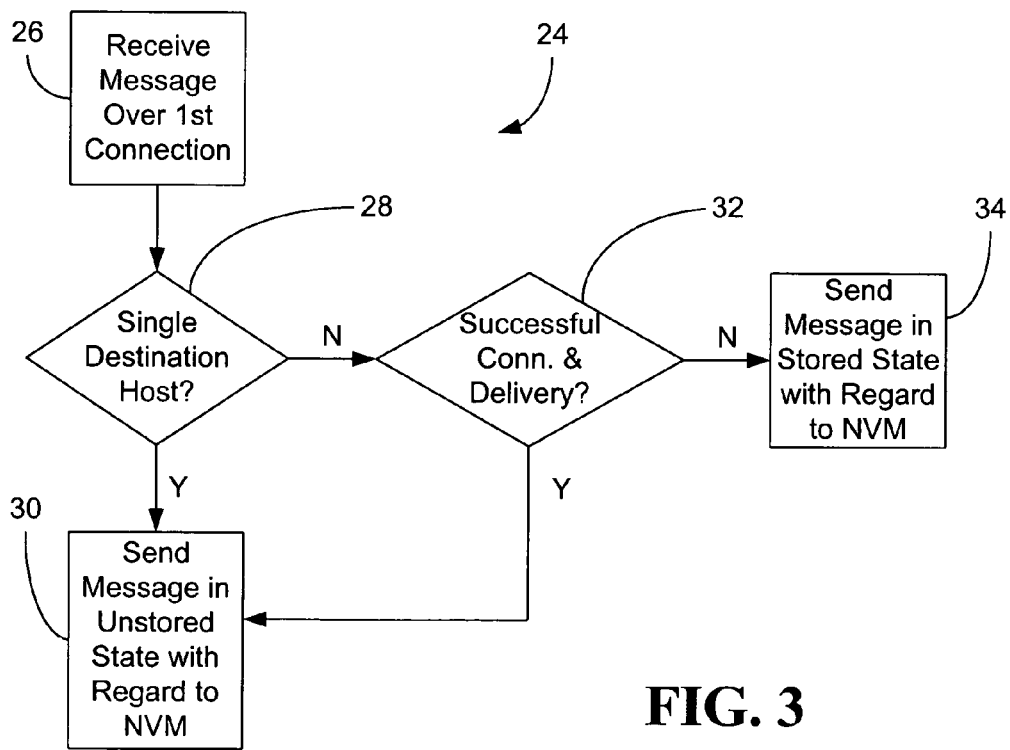
FIG. 3 is a flowchart of an example of a method of processing incoming data according to an alternative embodiment of the invention.

Turning now to FIG. 3, another method 24 of routing incoming data such as messages is shown. The method 24 can be implemented as a set of instructions capable of being executed by a processor to achieve stateless routing. The instructions can be written using any number of well known software programming techniques and can be stored in a wide variety of machine readable media such as EEPROM, CD-ROM, DRAM, etc. Generally, a message or other type of incoming data is received over a first connection at processing block 26. Block 28 provides for determining whether the message has a single destination host. The message is sent toward the destination host over a second connection at block 30, where the message is sent in an unstored state with regard to NVM if the message has a single destination host. Thus, in the illustrated example, the determination of whether to employ stateless routing is partially based on the number of destination hosts.

Although methods 24 and 100 (FIG. 2) can be used by each router in the virtual circuit to provide stateless messaging, it should be noted that all routers in the connection need not be enabled with stateless routing functionality. In such a case, the benefits associated with stateless routing are reaped locally at each stateless messaging router.

In the case of multiple destination hosts, block 32 provides for determining whether successful connection to each destination host and delivery of data to each destination host can be achieved. If so, the message is sent toward each destination host in an unstored state with regard to NVM at block 30. Otherwise, the message is sent in a stored state based on a conventional store-and-forward model at block 34.

Figure 4:
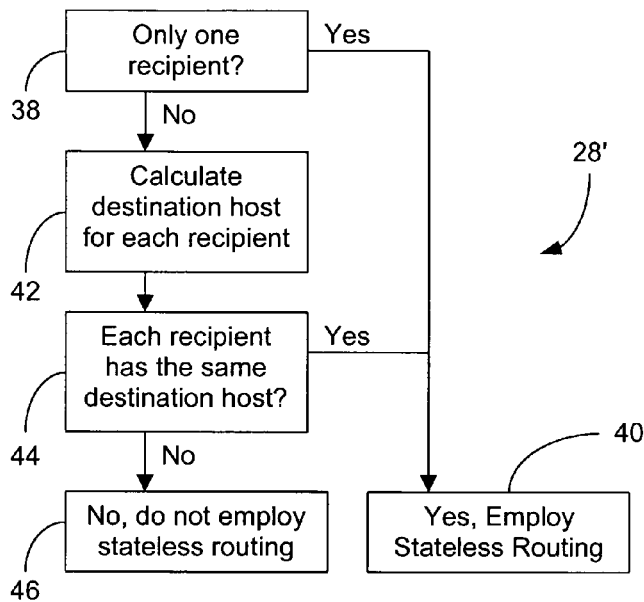
FIG. 4 is a flowchart of an example of a process of determining eligibility for stateless routing according to one embodiment of the invention.

FIG. 4 shows one approach to determining whether the message has a single destination host at block 28' (FIG. 3), where a single destination host is the only indicator of stateless routing eligibility. Specifically, block 38 provides for determining whether the message has a single recipient. If so, stateless routing is used at block 40. If the message has multiple recipients, block 42 provides for calculating a destination host for each recipient and block 44 determines whether each recipient has the same destination host. If so, stateless routing is used at block 40. Otherwise, block 46 provides for conventional routing.

Figure 5:
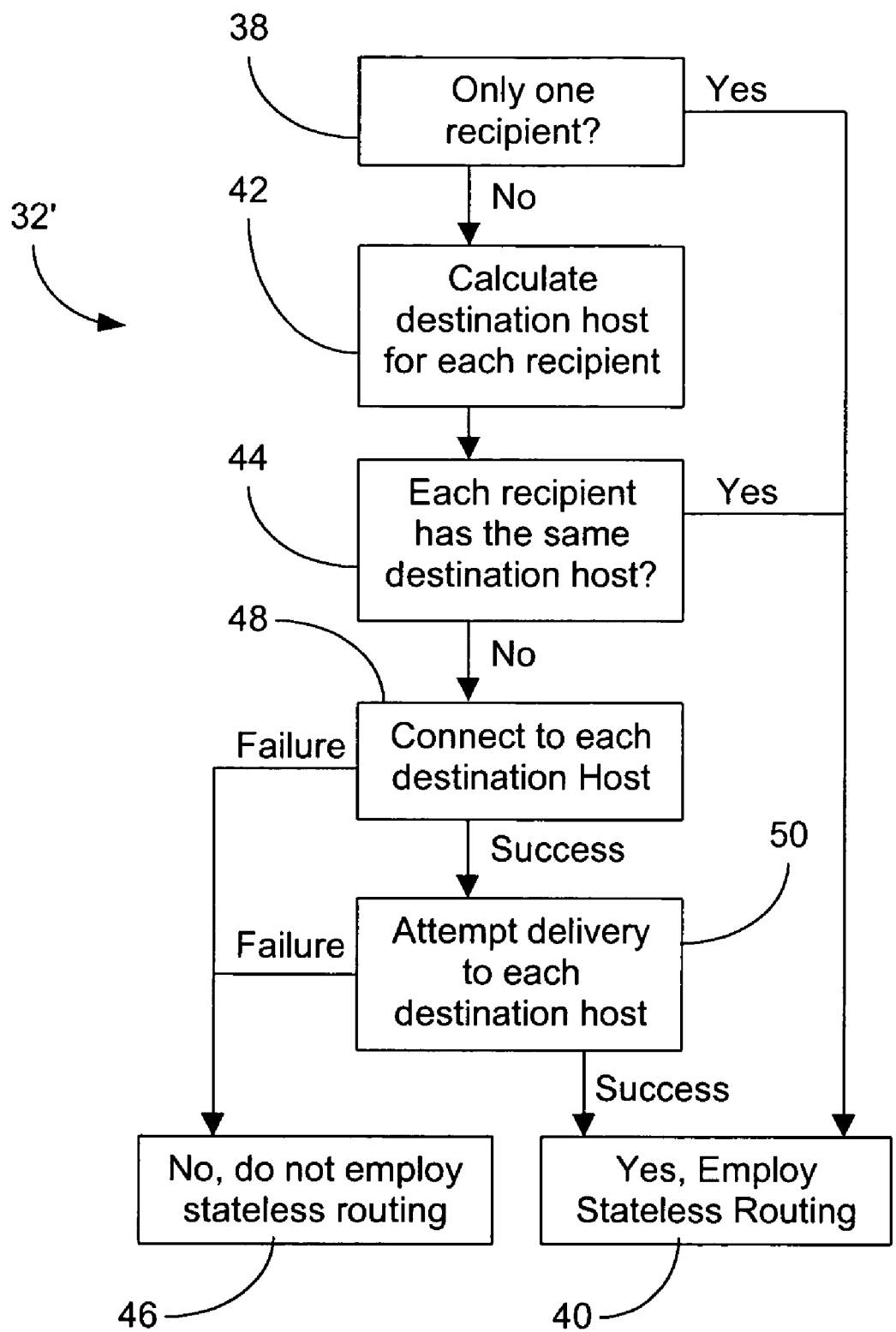
FIG. 5 is a flowchart of an example of a process of determining eligibility for stateless routing according to an alternative embodiment of the invention.

As already noted, it is also possible to employ stateless routing in the case of multiple destination hosts. Thus, FIG. 5 shows an approach to determining whether successful connection to each destination host and delivery of data to each destination host can be achieved at processing block 32' (FIG. 3). In this approach, if multiple destination hosts are encountered at block 44, block 48 provides for determining whether connection can be made to each destination host. If so, block 50 provides for determining whether the message can be delivered to each destination host over each connection. If so, stateless routing is used at block 40. If a failure is detected at either block 48 or block 50, stateless routing is not used.

Figure 6:
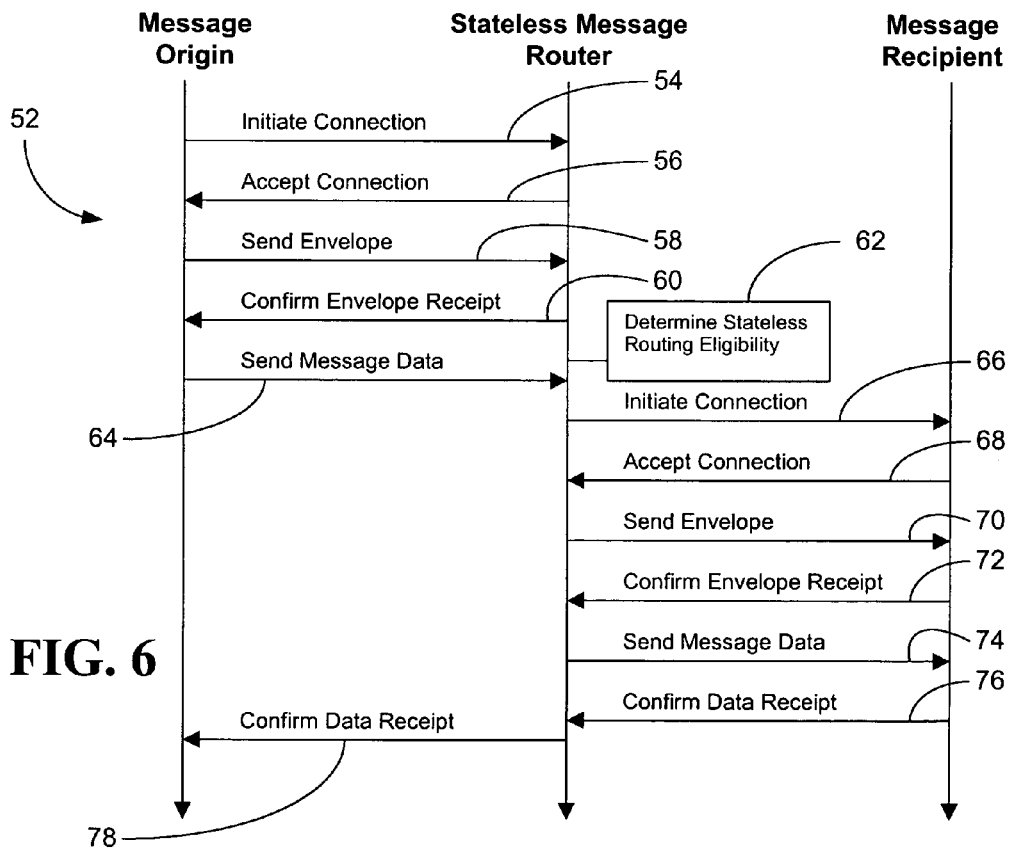
FIG. 6 is a messaging diagram of an example of a stateless routing connection according to one embodiment of the invention.

Turning now to FIG. 6, one approach to establishing and maintaining a stateless routing connection is shown in messaging diagram 52. Specifically, a first connection is initiated with a message 54 and the first connection is accepted by the message router with message 56. Message 58 is sent in response to message 56, where message 58 includes an envelope having data regarding the origination and destination(s) of the primary message. The message router confirms receipt of the envelope by sending message 60, and determines whether the primary message is eligible for stateless routing at block 62. The determination at block 62 can be in accordance with the processes 28' (FIG. 4) and/or 32' (FIG. 5) discussed above. For example, block 62 may result in a determination that there is only a single destination host. Message 64 includes the data from the primary message, and is transmitted in response to receipt of message 60. A second connection is initiated with message 66 and acceptance of the second connection is acknowledged in message 68. The envelope is forwarded toward the message recipient in message 70 and message 72 provides for confirmation of receipt of the envelope. The message router sends the primary message data via message 74 in response to message 72. The primary message data in message 74 is sent in an unsaved state with regard to NVM in order to eliminate the latencies associated with conventional store-and-forward routing. Messages 76 and 78 confirm receipt of the message data, and are transmitted only after the primary message reaches the intended recipient.

It should be noted that although there is the risk of a malfunction occurring at the stateless message router during the time period between transmission of message 74 and receipt of message 76, a similar risk exists with regard to the traditional store-and-forward model for message routing. In either case, data receipt will not be confirmed and the primary message will be delivered more than once. A malfunction may occur with either the message sender, message router, or with the network connection between the two hosts. This risk is described in Duplicate Messages and SMTP (Network Working Group, RFC-1047, February 1988)

Figure 7:
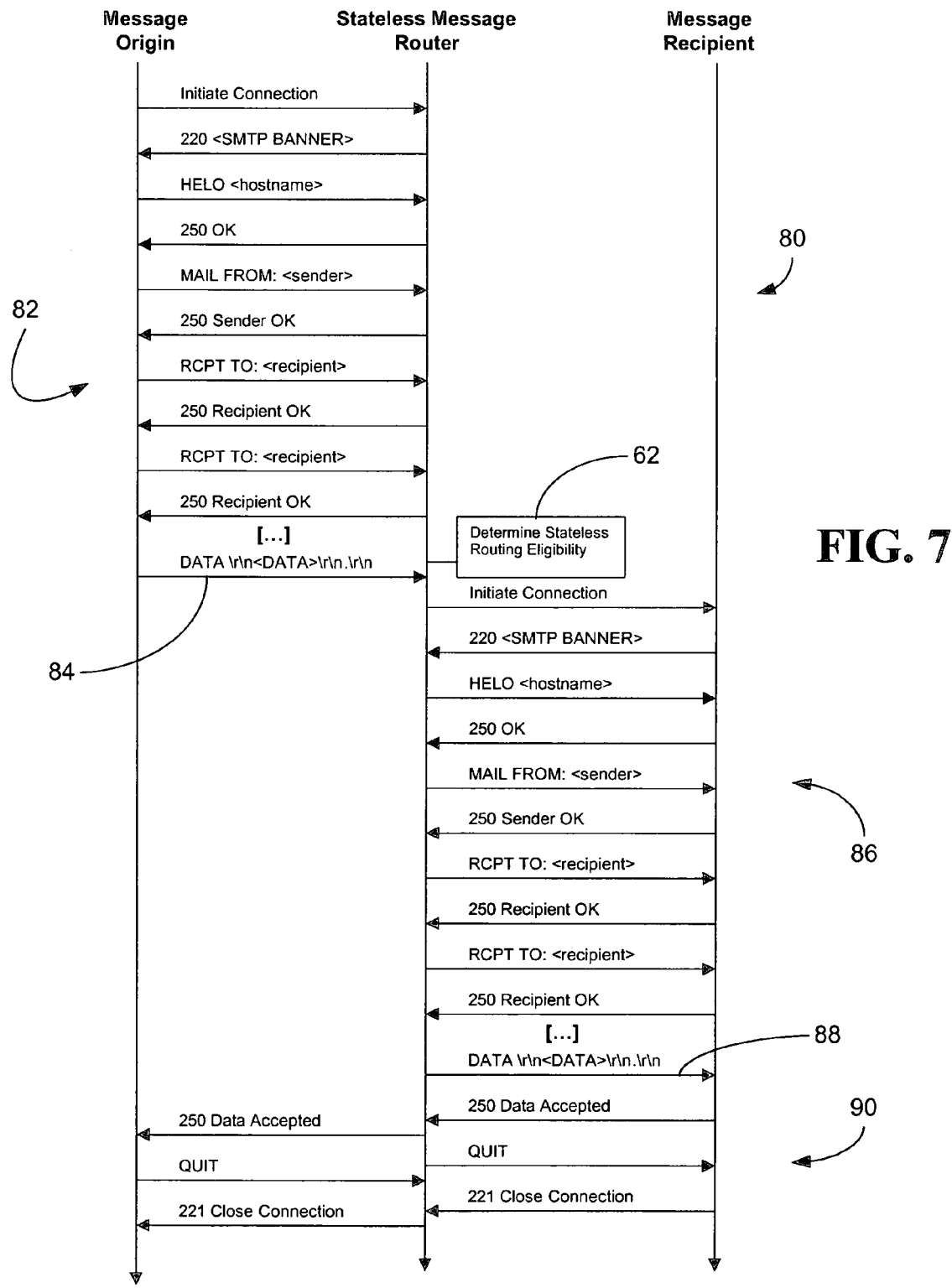
FIG. 7 is a messaging diagram of an example of a stateless routing connection according to an alternative embodiment of the invention.

FIG. 7 shows a messaging diagram 80 in which the SMTP protocol is used to establish the connections. Generally, the first connection is initiated through messages 82 and the primary message data is sent in message 84. The second connection is established through messages 86 and the primary message data is sent in message 88. Confirmation of data receipt and closing of the connections is achieved through messages 90. As already noted, SMTP is merely one of several protocols that may be used.

Stateless message routing may therefore be employed to route a message without first saving the message to nonvolatile memory. The sender host first sends a message to the message router, but the message router does not immediately confirm the receipt of the message. Instead the message router connects to the receiver host and sends the message to the receiver. Only after the receiver confirms receipt of the message, does the router send confirmation to the sender. This approach avoids storage of a copy of the message in nonvolatile memory while at the same time ensuring that each message that is confirmed as "received" to the sender is delivered the recipient even in the case of system failure.

Stateless message routing uses both an incoming connection for receiving a message and an outgoing connection for sending the message. Unlike in traditional messaging systems, both connections are active at once. Thus, stateless message routing requires more active connections than traditional messaging systems. One approach is to use asynchronous input/output (I/O) to manage these connections.

If a message must traverse a chain of message routers before reaching its final destination and each message router employs stateless routing, it may be more efficient to establish a "virtual circuit" for message routing before message data is sent. Any message routing protocol (e.g., SMTP) can be extended to allow for the management of such virtual circuits.

Since all messages may not be deliverable via stateless message routing, one approach is to deploy stateless message routing alongside traditional message routing in a hybrid system. Examples of specific implementations are described in greater detail below.

Stateless Routing with a Single Recipient Host

A system configured in accordance with the embodiments described above is able to detect when stateless routing is possible and when it is not. Each incoming message can have a list of recipients associated with it. In the case of the SMTP message routing protocol, these recipients are indicated by "RCPT TO" commands. Each recipient has a particular destination host for which the message must be routed. The destination host is determined by an algorithm particular to the message routing protocol. For SMTP it is determined by using a DNS lookup to determine the hostname and IP address of the recipient host. If the destination host of each message recipient is the same, stateless routing may be employed for delivery of that message.

For stateless routing with a single recipient host, there may be a slightly higher probability of message duplicates than with traditional message routing. The risk is that the message router will crash or the origin server will disconnect during the time period between the message recipient confirming message receipt and the messaging gateway confirming message receipt to the message originator. If this happens, the message will be sent but the message originator will not consider the message as being sent, possibly resulting in a duplicate message. The time savings associated with stateless routing, however, far outweigh the potential costs associated with duplicate messages.

Optimistic Stateless Message Routing

As already noted, it is possible to attempt stateless routing even if there are multiple recipient hosts. In such a case, delivery can be attempted to each host in series or in parallel. If delivery fails to one or more of the hosts, the message can be written to nonvolatile memory.

For "optimistic" stateless routing, the time period between the first message recipient confirming a message receipt and the last message recipient confirming receipt could be quite long. For SMTP message routing, the SMTP RFC allows up to ten minutes for an SMTP server to confirm message receipt. A malfunction during that time period, including sender failure, router failure, or network disconnection, may result in a duplicate message being delivered. As already noted, the potential costs associated with duplicate messages can be negligible.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method of processing incoming data, comprising:
storing, by a router, historical data for a destination host;
receiving, by the router, incoming data; and
determining, by the router, that stateless routing of the incoming data is to be employed based on the stored historical data for the destination host associated with the incoming data, wherein the stored historical data is independent of the incoming data;
generating a probability decision representative of whether stateless routing is to be employed by
generating a probability decision for each of a plurality of destination hosts associated with the incoming data; and
multiplying the probability decisions together to represent whether stateless routing is to be employed.

2. The method of claim 1, further including:
storing the incoming data only in volatile memory when stateless routing is to be employed.

3. The method of claim 2, further including withholding confirmation of receipt of the incoming data until confirmation of delivery is received from either the destination host or a downstream router.

4. The method of claim 3, wherein a copy of the incoming data is to be stored in nonvolatile memory by a sender of the incoming data until the confirmation of receipt is received at the sender.

5. The method of claim 3, further including:
receiving the confirmation of delivery; and
sending the confirmation of receipt toward a sender of the incoming data.

6. The method of claim 2, further including aborting the stateless routing by storing the incoming data in nonvolatile memory and sending confirmation of receipt of the incoming data toward a sender of the incoming data.

7. The method of claim 1, wherein the historical data includes at least one of previous stateless routing outcomes and previous routing latencies.

8. The method of claim 7, further including calculating a success rate probability based on the previous routing outcomes.

9. The method of claim 7, further including calculating a weighted latency average based on the previous routing latencies.

10. The method of claim 1, further including:
receiving control data, wherein the determination to employ stateless routing is also based on the control data.

11. The method of claim 10, wherein the incoming data is received in a data channel and the control data is received in a control channel.

12. The method of claim 10, wherein the incoming data and the control data are received in a data channel.

13. The method of claim 10, wherein the control data includes at least one of a time-to-live value, a hop count value and a maximum-hop value for the incoming data.

14. The method of claim 13, further including reducing at least one of the time-to-live value and the maximum-hop value if the incoming data is associated with a plurality of destination hosts.

15. The method of claim 1, wherein the incoming data is received over a first connection, the method further including sending the incoming data toward the destination host over a second connection, the first and second connections being part of a virtual circuit.

16. The method of claim 15, wherein the sending of the incoming data begins before completion of the receiving of the incoming data.

17. The method of claim 1, wherein the incoming data includes a message.

18. A method of processing messages comprising:
storing, by a router, historical data for one or more destination hosts;
receiving, by the router, control data;
receiving, by the router, a message over a first connection, the message being associated with the one or more destination hosts;
determining, by the router, that stateless routing of the message is to be employed based on the historical data and the control data, wherein the determination is based on a generated probability decision representative of whether stateless routing is to be employed;
storing, by the router, the message only in volatile memory and withholding confirmation of receipt of the message if it is determined that stateless routing is to be employed;
sending, by the router, the message to the one or more destination hosts over additional connections forming one or more virtual circuits;
receiving, by the router, confirmation of delivery from one or more destination hosts associated with the message; and
sending, by the router, the confirmation of receipt to a sender of the message.

19. The method of claim 18, wherein a copy of the message is stored by the sender of the message in nonvolatile memory until the confirmation of receipt is received at the sender.

20. The method of claim 18, wherein the historical data includes at least one of previous stateless routing outcomes and previous stateless routing latencies.

21. The method of claim 18, wherein the control data includes at least one of a time-to-live value, a hop count value and a maximum hop value for the message.

22. The method of claim 18, wherein the sending of the message begins before completion of the receiving of the message.

23. A computer readable storage medium encoded with computer executable instructions to:
   store historical data for the destination host;
   receive incoming data; and determine that stateless routing of the incoming data is to be employed based on the historical data for the destination host associated with the incoming data, wherein the stored historical data is independent of the incoming data;
   generating a probability decision representative of whether stateless routing is to be employed by
   generating a probability decision for each of a plurality of destination hosts associated with the incoming data; and
   multiplying the probability decisions together to represent whether stateless routing is to be employed.

24. The medium of claim 23, wherein the instructions are further capable of being executed to:
   store the incoming data only in volatile memory.

25. The medium of claim 24, wherein the instructions are further capable of being executed to withhold confirmation of receipt of the incoming data until confirmation of delivery is received from either the destination host or a downstream router.

26. The medium of claim 25, wherein a copy of the incoming data is to be stored in nonvolatile memory by a sender of the incoming data until the confirmation of receipt is received at the sender.

* * * * *